No. 754,447. PATENTED MAR. 15, 1904.
P. J. HEDLUND.
STEAM TURBINE.
APPLICATION FILED JUNE 13, 1903.
NO MODEL.
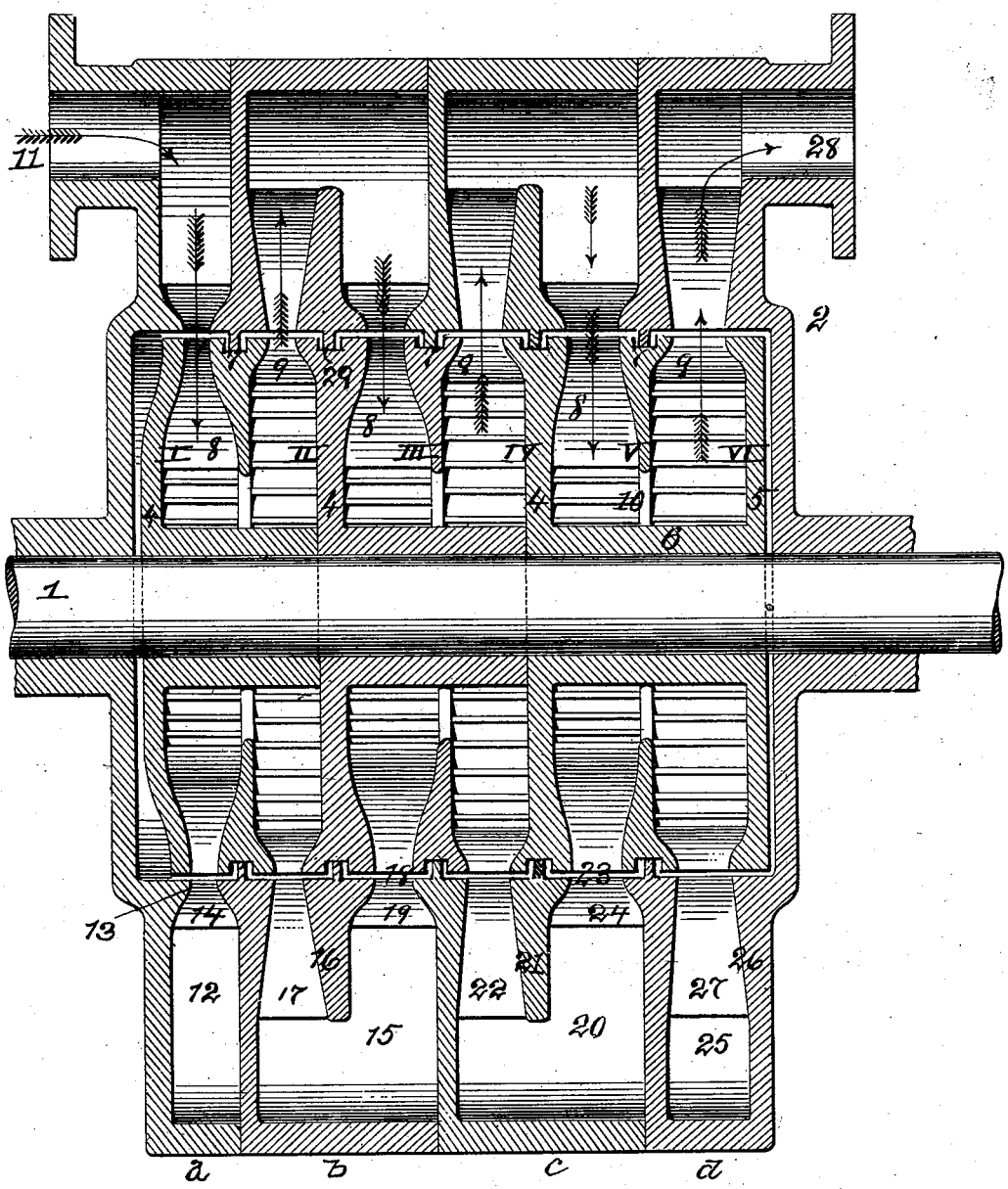
WITNESSES:
INVENTOR
Per Johan Hedlund
BY
ATTORNEY No. 754,447. Patented March 15, 1904.

UNITED STATES PATENT OFFICE.

PER JOHAN HEDLUND, OF STOCKHOLM, SWEDEN.

STEAM-TURBINE.

SPECIFICATION forming part of Letters Patent No. 754,447, dated March 15, 1904.

Application filed June 13, 1903. Serial No. 161,329. (No model.)

*To all whom it may concern:*

Be it known that I, PER JOHAN HEDLUND, of Stockholm, Sweden, have invented a new and useful Improvement in Steam-Turbines, of which the following is a specification.

The invention relates to compound elastic-fluid turbines, and has for its object to increase the economy and efficiency thereof.

The working fluid is first expanded in the inlet-conduit of the wheel-casing down to a velocity which depends upon the restricted area of the outlet of said conduit. From said outlet it passes into the wheel through a circumferential opening registering therewith. The walls of the wheel diverge inwardly from said opening, and between said walls are disposed a series of buckets. By reason of this divergence the velocity of the entering fluid is changed to pressure, and at the same time it acts by impact on the wheel-buckets to cause rotation of the wheel. The fluid then passes through an opening within the wheel, near the hub thereof, and then moves radially outward, and finally escapes at the contracted annular outlet between a second series of buckets there disposed. The escaping fluid thus exercises a reactive effect in assisting the rotation of the wheel. The exhaust then passes through a De Laval nozzle disposed in a passage in the casing, whereby the velocity of the efflux is converted into pressure in said passage, and finally it escapes through the contracted annular outlet of said passage to the next wheel of the series, when the same cycle is repeated.

The accompanying drawing is a vertical longitudinal section of my turbine.

1 is the wheel-shaft journaled in the casing 2. Upon it are disposed alternately radial inward-flow wheels I III V, and radial outward-flow wheels II IV VI. The inward-flow wheels deliver their exhaust directly into the outward-flow wheels. The outward-flow wheels deliver their exhaust to the inward-flow wheels through intermediate passages in the wheel-casing. A preferable mode of constructing and arranging the wheels is as here shown. The end wheels V VI are provided with heads 4 5, integral with the hub 6. Between said heads is an annular partition 7, which is supported by the buckets 8, interposed on one side between said partition and head 4, and by the buckets 9, interposed on the other side between said partition and head 5. Between partition 7 and hub 6 is the annular opening 10. The wheels V VI thus form practically one wheel with a double set of buckets, into each of which the working fluid passes in turn, moving first radially inward the wheel and then radially outward. In constructing the remaining wheels of the series I omit in each case the head 5, the buckets 9 of wheel IV connecting the annular partition 7 of that wheel with the head 4 of wheel V and the buckets 9 of wheel II connecting the annular partition 7 of that wheel with the head 4 of wheel III. The inlet-opening of wheels I III V is circumferential, and the walls of the said wheels diverge inwardly, the buckets 8 being located between said diverging walls. The outlet-opening of wheels II IV VI is circumferential, and the walls of said wheels also diverge inwardly, the buckets 9 being located between said diverging walls.

The casing 2 is preferably made in sections connected in any suitable manner, each of which contains a passage for the working fluid. In section *a* is the inlet 11 for the working fluid and an annular chamber 12, having a contracted outlet 13 registering with the circumferential inlet of wheel I. Between the walls converging to said contracted outlet are guide-blades 14. In section *b* is an annular chamber 15, having an inlet-passage 16 registering with the outlet of wheel II and provided with diverging walls and guide-blades 17. The outlet 18 is contracted and also provided with guide-blades 19. In section *c* is an annular chamber 20, having an inlet-passage 21 registering with the outlet of wheel IV and provided with diverging walls and guide-blades 22. The outlet 23 is contracted and provided with guide-blades 24 and registers with the inlet of wheel V. In section *d* is an annular chamber 25, having an inlet-passage 26 registering with the outlet of wheel VI and provided with guide-blades 27. Said chamber communicates with the final exhaust-outlet 28.

The course of the fluid is indicated by the arrows in the drawing. Its velocity is augmented by reason of the contraction of the outlet 13, and said velocity is changed into pressure in wheel I by reason of the divergence of the walls thereof. From wheel I the fluid passes by opening 10 to wheel 2, and on escaping therefrom the contracted outlet of said wheel causes an augmentation of its velocity. The passage 16 is substantially a De Laval nozzle, wherein, as fully explained in United States Patent No. 717,875, granted to Tore G. E. Lindmark, the said velocity is converted into pressure. The velocity is again increased before passing into wheel III, and then the cycle already described is repeated in the successive pairs, III IV and V VI, of wheels until the fluid escapes at the final exhaust-outlet 28.

The casing 2 is preferably made in two parts bolted together, as indicated in dotted lines. In order to prevent leakage of steam from inlet to outlet outside of the wheels, the casing-partitions are provided with ribs 29, which enter recesses in the wheel-partitions 4 and 7, as shown.

I claim—

1. An elastic-fluid turbine-wheel having two parallel communicating chambers each having walls diverging inwardly from a circumferential opening, and buckets disposed between said diverging walls.

2. An elastic-fluid turbine-wheel having two parallel communicating chambers each having walls diverging inwardly from a circumferential opening, and buckets disposed between said diverging walls, in combination with a casing having an annular chamber provided with a contracted outlet registering with the inlet-opening of said wheel.

3. An elastic-fluid turbine-wheel having two parallel communicating chambers each having walls diverging inwardly from a circumferential opening and buckets disposed between said diverging walls in combination with a casing having an annular chamber provided with a contracted inlet registering with the outlet-opening of said wheel.

In testimony whereof I have signed my name to this specification in the presence of two subscribing witnesses.

PER JOHAN HEDLUND.

Witnesses:
WM. A. FURMAN,
C. R. TAYLOR.